E. E. Matteson,
Water Wheel.
N° 38,687. Patented May 26, 1863.
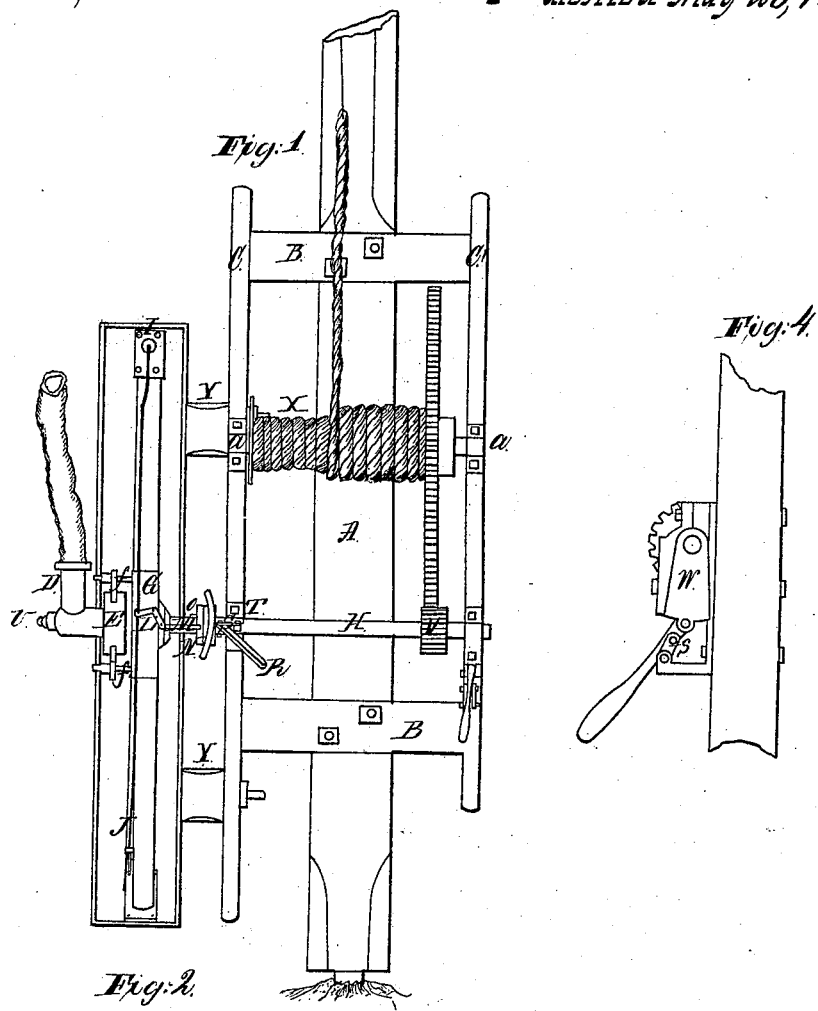
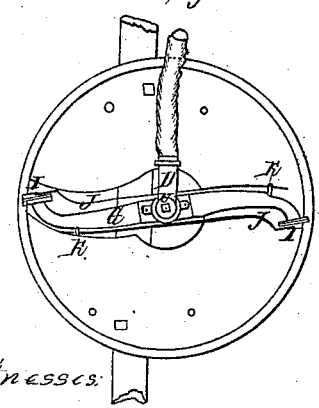
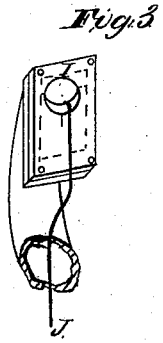
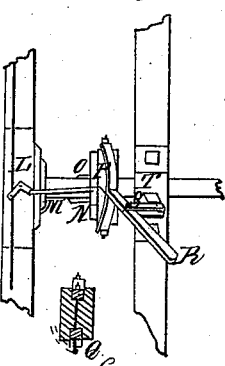
Witnesses.
Alexander Lowery
William H. Gubby
Inventor.
Edward E. Matteson

UNITED STATES PATENT OFFICE.

EDWARD E. MATTESON, OF NEVADA, CALIFORNIA.

IMPROVEMENT IN CENTRIFUGAL WATER-WHEELS.

Specification forming part of Letters Patent No. 38,687, dated May 26, 1863; antedated March 12, 1863.

*To all whom it may concern:*

Be it known that I, EDWARD E. MATTESON, of the city and county of Nevada, State of California, have invented a new and useful improvement upon the machine known and described as the "centrifugal water-wheel," for the elevating of weights, and as a motive power for propelling machinery; and I do hereby declare that the following is a full, clear, and exact description of the construction and operation of the same, reference being had to the annexed drawings, comprising part of this specification, in which—

Figure 1 is a front view; Fig. 2, a sheet-iron circular incasement of the centrifugal wheel; Fig. 3, a section of the centrifugal wheel, showing gates or valves for shutting off water or steam. Fig. 4 is a sliding box and a bush for connecting and disconnecting the shaft from the main wheel, or throwing the machine out of gear. Fig. 5 is a clutch and its connecting-rods.

And, as a more particular description of the parts of said invention, reference is had of the sections of the accompanying drawings.

Letter A is a vertical column, resting upon any solid foundation, to which are securely bolted the girts B B, and the upright pieces C C are mortised and keyed in a substantial manner to said girts. To column A may be attached a boom or derrick for hoisting purposes, or pulleys for propelling all kinds of machinery.

D represents a penstock or pipe, so constructed as to allow hose or pipe to be fastened to the upper end thereof, through which water or steam is admitted. The inside end of the horizontal portion of said pipe is fitted to the stuffing-box B. Said stuffing-box is fitted to and held against a similar hollow projection from the S-shaped wheel, securely attached by means of bolts $f\ f$ to the wheel, which bolts or screws serve for tightening or loosening said stuffing-box, as may be desired.

G represents the hollow arm or S-shaped wheel, securely fastened by a key upon the shaft H.

Fig. 3 shows the mode of construction of the two extremities of the wheel, the same being a square flange, and built with a recess, as shown by the dotted lines, to receive the valves or gates I I, the face-plate with the circular aperture being bolted securely to the same for holding the gates or valves in their proper position, and allowing the same to slide in the recess.

J J are rods attached to the valve or gates for the purpose of opening or closing the same, properly bent to the shape of the wheel, the opposite ends of which pass through guides K K, which are also secured to the wheel. L L are elbows attached by screw pivot-pins near the center of the wheel, one arm of which is fastened to each rod J J. The other arms of said elbows are attached to rods M M. Said rods connect with the movable collar N, Fig. 5, and are also fastened by pivot-pins. Said collar revolves with the shaft and wheels and is fitted with the feather O, which allows said collar to move horizontally upon the shaft, the collar N having a groove to admit another semicircular collar, P, the ends of which are held by a bolt and screw, Q, and is so constructed as to remain stationary while the collar N revolves. The lever R is provided with two arms, forming a half circle, each end being secured by pivot-screws on the upper and lower sides of the semicircular collar Q. The fulcrum-straps S S are fastened to one end of the lever by a pivot pin. The other end is secured to the journal box T by a similar pin. The shaft H extends through the centrifugal wheel G, and also through the horizontal portion of the penstock or pipe D, the projecting end at that point being threaded to admit of the nut and washer U, for regulating the said pipe or penstock in the stuffing-box E. At the other end of said shaft H is firmly secured a spur-gear pinion, V. The shaft H revolves in two journal-boxes, T and W. The one marked T is secured by bolts to the upright piece C. The other journal-box and bush, W, is bolted to the upright piece C', which bush is applied for throwing the pinion V out of gear. The lever with its fulcrum-straps, as is described in Fig. 5, is attached to the sliding bush W, for moving the same. The shaft X, running in two journal-boxes, $a\ a$, which are bolted securely to the upright pieces C C, is provided with a spur-gear, fastened by keys or otherwise to the said shaft, corresponding to the pinion V. Upon the same shaft is secured a flange which forms a drum to serve as a guide to ropes or chains, as shown in Fig. 1, in hoisting.

Y Y represent timbers for the reception of the wheel incasement shown in Fig. 2, having a rim and flange, as will be seen in the accompanying drawings, which serve to prevent the splashing of the water, an aperture being provided at the lower edge to allow the same to pass off.

The application of steam instead of water as medium of power can be employed with advantage.

What I claim as my invention is—

The combination of the centrifugal wheel or hollow arm with the gates or valves, together with the sliding rods, elbows, and clutch, with its connecting-rods and lever, and the movable and stationary collars, substantially as shown and described.

EDWARD E. MATTESON.

Witnesses:
W. H. LIBBY,
W. H. ROOT.